United States Patent [19]

Fraser

[11] 4,331,283
[45] May 25, 1982

[54] METAL CLADDING

[75] Inventor: Malcolm J. Fraser, Upper St. Clair Township, Allegheny County, Pa.

[73] Assignee: Copperweld Corporation, Pittsburgh, Pa.

[21] Appl. No.: 52,624

[22] Filed: Jun. 27, 1979

[51] Int. Cl.³ .................. B23K 20/04; B21D 29/04
[52] U.S. Cl. ................................. 228/130; 228/156
[58] Field of Search ............. 228/129, 130, 148, 156

[56] References Cited

U.S. PATENT DOCUMENTS 3,054,176  9/1962  Beneke ........................... 228/130 X
3,714,701  2/1973  Dion et al. ........................ 228/130
4,260,095  4/1981  Smith ............................... 228/130

FOREIGN PATENT DOCUMENTS 122897  5/1931  Austria ............................. 228/129

Primary Examiner—Gil Weidenfeld
Assistant Examiner—K. J. Ramsey
Attorney, Agent, or Firm—Buell, Blenko, Ziesenheim & Beck

[57] ABSTRACT

The specification discloses manufacture of clad rod and the like by rolling cladding strip on to the core rod. By matching the core rod cross section, cladding strip cross section, and roll pass design a composite clad rod of improved concentricity may be produced.

3 Claims, 6 Drawing Figures

U.S. Patent May 25, 1982 Sheet 1 of 2 4,331,283
Round (Nominal) Roll Pass
Fig. 1.
 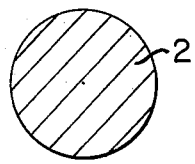 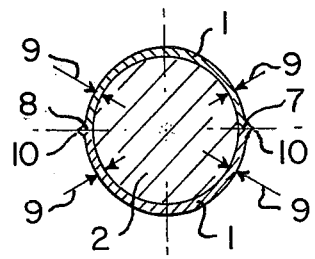
Fig. 3.
 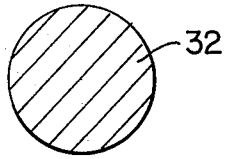 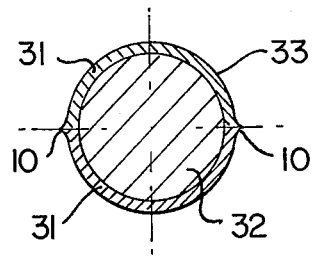
Oval Roll Pass
Fig. 4.
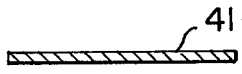 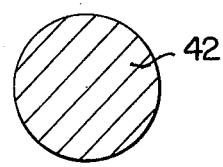 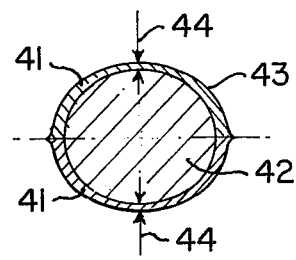
Fig. 5.
 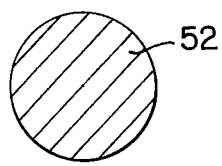 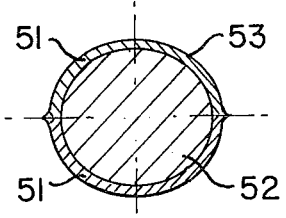
Fig. 6.
 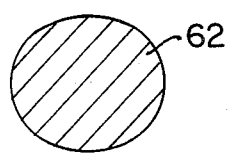 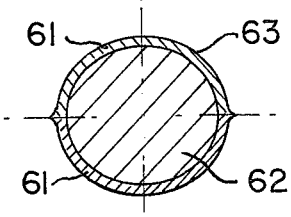

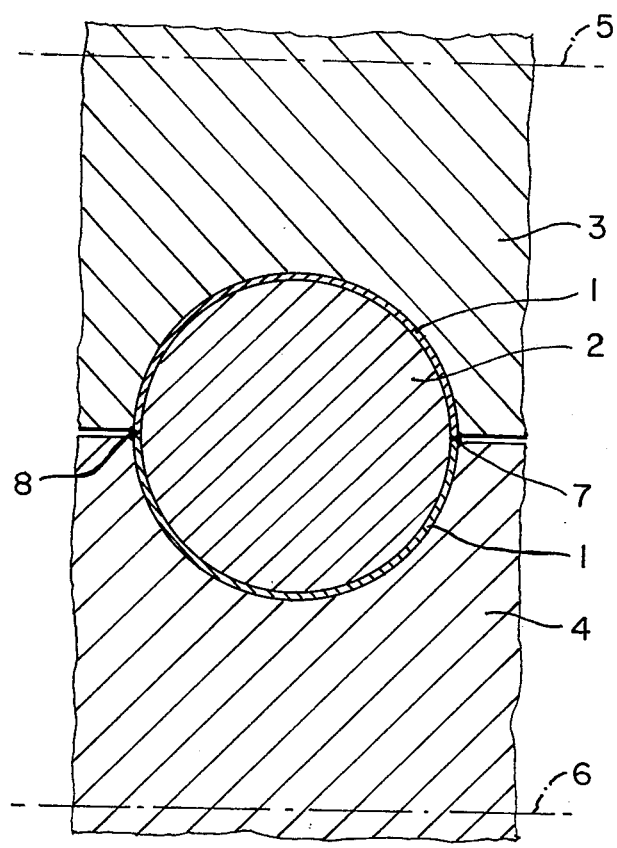

METAL CLADDING

This invention relates to cladding of one metal with a sheath of another metal to form bimetallic wire, rod, and the like. More particularly, the invention relates to shaping substantially flat strip cladding metal around a core rod and then rolling the materials to form a composite clad rod and the like.

The production of bimetallic wire, rod, and the like is well-known. Common products include a steel core clad with copper and a steel core clad with aluminum. One known method of manufacture involves casting copper around a steel bar followed by rolling. Another method involves moving a steel rod through a bath of molten copper and freezing a controlled thickness of copper on the core rod. It has also been known to shape two flat strips of cladding metal around a core rod and then to roll the two strips of cladding metal and the core rod to obtain metallurgical bonding of the cladding material to the core material. The cladding strips, or the core rod, or both may be heated to provide easier shaping and improved bonding. The bimetallic rod which is produced may be further rolled and drawn to reduce it to desired diameter.

In rolling strips of cladding metal onto the core rod it has been found that the thickness of the cladding metal is not uniform around the circumference of the rod. Variations in cladding thickness in the initial rod are reflected in the final product notwithstanding intermediate reduction by rolling or drawing. For many finished product specifications the usual variations in thickness of cladding metal are within limits and are tolerable. In the use of a rod which involves little drawing after forming or which carries a stringent requirement for claddng uniformity or core concentricity, the usual commercial product may fall short of meeting the specification.

I form clad rod and the like with precise control of concentricity by matching the cross section configurations of the core rod, of the cladding strip, and of the roll pass by which the cladding strip is applied to the core rod.

I may roll cladding strips having a non-rectangular cross section onto a core rod having a circular cross section. I may also roll cladding strips on to a core rod having a non-circular cross section. I match the cross sectional configurations of the cladding strips, core rod, and roll pass to produce a composite clad rod in which there is a high level of concentricity of the core and cladding material. In other words, the thickness of the cladding material is uniform to a far higher degree than by known processes. In one form of the invention, I provide cladding strips whose thickness varies at different points from side to side of the strip and roll them on to a core rod of circular cross section in a roll pass of nominally circular cross section. I may also roll cladding strips of different non-rectangular cross section on to a circular core rod in an oval roll pass. Further, I may roll cladding strips on to a core rod of oval cross section. I prefer to employ a core rod of circular cross section and to use cladding strips of non-rectangular cross section.

Other details, objects and advantages of my invention will become more apparent as the following description of certain present preferred embodiments thereof proceeds.

In the accompanying drawings, I have illustrated certain present preferred embodiments of my invention with certain details and dimensions exaggerated for clarity of illustration in which:

FIG. 1 shows a strip of cladding metal of rectangular cross section, a core rod of circular cross section and the clad rod which results when two such strips are rolled on to the circular core in a nominally round cross section roll pass;

FIG. 2 is a fragmentary sectional view of the cladding strips and core rod of FIG. 1 showing the forming rolls at the point of maximum bite.

FIG. 3 is similar to FIG. 1 showing a cladding strip of modified "bow-tie" cross section, a circular core rod and the clad rod which results when rolled in a nominally round cross section roll pass;

FIG. 4 is similar to FIG. 1 showing a cladding strip of rectangular cross section, a round core rod and the clad rod which results when rolled in an oval cross section roll pass;

FIG. 5 is similar to FIG. 1 showing a cladding strip of oval cross section, a round core rod, and the clad rod which results when rolled in an oval cross section roll pass; and FIG. 6 is similar to FIG. 1 showing a cladding strip of rectangular cross section, an oval core rod and the clad rod which results when rolled in an oval cross section roll pass.

Previous proposals for forming a cladding strip around a core rod have ordinarily involved use of two cladding strips having a rectangular cross section and formed around a core rod of circular cross section. The cladding strips are then rolled on to the core rod by passing all three pieces between rolls in which the roll pass has a nominally circular cross section. It is not practicable to form a rod or to reduce it by rolls in which the pass is a true circle. There is instead some deviation, especially around the outer circumference of the rolls. The result is that the composite clad rod produced by rolling comprises a core with cladding which varies in thickness from place to place around the circumference of the composite rod.

Such a practice is illustrated in FIGS. 1 and 2. Two cladding strips 1 of rectangular cross section are rolled around a core rod 2 of circular cross section. After shaping of the cladding strips to the general configuration of the core rod the cladding strips are rolled and bonded to the core rod between two rolls 3 and 4 (FIG. 2). Roll 3 revolves on an axis 5 and roll 4 revolves upon an axis 6. The roll pass, or opening, in the opposing faces of rolls 3 and 4 accomodates the two cladding strips 1 and core rod 2. The edges of the two cladding strips are in juxtaposition at 7 and 8. The pressure applied by rolls 3 and 4 causes some extrusion of the cladding metal and forms fins or flash 10. Fins 10 may be removed by skiving. The composite rod may then be reduced further by rolling or drawing or both. After bonding of the cladding strips further reductions by rolling or drawing cause substantially proportional reductions of the cladding metal and core metal. Accordingly, any irregularities in cladding thickness appear in the proportion even after substantial reduction in diameter.

As shown in FIG. 2 the cross section of the roll pass and of the resulting clad rod is perfectly circular and there is perfect concentricity of the core and cladding metal. In practice, however, a different result is produced as shown in the right hand view of FIG. 1. Imperfections in the composite rod are magnified in the drawings for purposes of illustration. Because of the impracticability of rolling a true circular cross section, in practice the roll pass is made slightly oval. The non-circular roll pass and the scrubbing action of the rolls in closing cladding strips 1 over core 2 causes the thickness of the cladding metal to be reduced at points above and below match lines 7 and 8. The area where thickness is reduced is indicated at points 9 which are about 30° to 45° from match lines 7 and 8 and the surfaces of rolls 3 and 4. The composite rod will be slightly oval in cross section. Reduction by rolling or drawing will restore the circular cross section, but the thin areas of the cladding will be reproduced in the resulting rod or wire product.

FIG. 3 shows two cladding strips 31, having a modified "bow-tie" section which are formed about a circular core rod 32 in a roll pass of nominally circular cross section. The "bows" supply added metal to the zone where scrubbing action tends to produce an oval shape and reduction in cladding metal thickness. The result is to produce a clad rod 33 having substantially uniform cladding thickness and a slightly oval cross section.

FIG. 4 shows the effect of rolling cladding strips 41 of rectangular cross section about a core rod 32 of circular cross section in a roll pass of oval cross section. Again a composite clad rod 43 will be produced. The cladding is deficient in thickness, however, at the top and bottom 44.

FIG. 5 shows the result of rolling cladding strips 51 of crowned cross section upon a circular core rod 52 to form a composite clad rod 53. The cross section of the composite rod will be oval, but the core and cladding material will be substantially concentric. Subsequent drawing will return the composite rod to a circular cross section while retaining good concentricity.

FIG. 6 shows the result of rolling cladding strips 61 of rectangular cross section on to an oval core rod 62 in a roll pass of oval cross section. Again, an oval cross section rod 63 will be produced with good concentricity of the core rod and cladding material.

It will be seen from the foregoing that by appropriate selection of the cross section of the cladding strips, core rod, and roll pass, it is possible to produce a composite clad rod having greater concentricity than heretofore and making possible the meeting of more stringent specifications relating to cladding thickness and variations therein.

While I have illustrated and described certain present preferred embodiments of my invention it is to be understood that I do not limit myself thereto and that my invention may be otherwise variously practiced within the scope of the following claims.

I claim:

1. The method of forming composite clad rod and the like having substantially uniform thickness of cladding material which comprises rolling a plurality of cladding strips having a "bow-tie" and the like cross section onto a circular core rod.

2. The method of claim 1 in which the thickness of the cladding strips is increased at points which are about 30° to 45° from the pass line of the forming rolls as the cladding strip is applied.

3. The method of forming composite clad rod and the like which comprises rolling two strips of crowned cross section on to a core rod of circular cross section in a roll pass of oval cross section.

* * * * *